United States Patent [19]
Cooper et al.

[11] Patent Number: 4,806,428
[45] Date of Patent: Feb. 21, 1989

[54] COMPOSITE CERAMIC ARTICLE AND METHOD FOR MAKING IT

[75] Inventors: Reid F. Cooper, Middleton, Wis.; Kishor P. Gadkaree, Big Flats, N.Y.

[73] Assignee: Corning Glass Works, Corning, N.Y.

[21] Appl. No.: 943,426

[22] Filed: Dec. 19, 1986

[51] Int. Cl.$^4$ .......................... B32B 5/16; B32B 9/00
[52] U.S. Cl. .................................. 428/403; 428/357; 428/361; 428/367; 428/402; 428/404
[58] Field of Search .............. 428/367, 357, 375, 380, 428/384, 903, 608, 379, 403, 402, 404, 361, 689, 201, 702

[56] References Cited

U.S. PATENT DOCUMENTS

| | | | |
|---|---|---|---|
| 2,699,415 | 1/1955 | Nachtman | 428/384 |
| 3,098,723 | 7/1963 | Micks | 428/389 |
| 3,372,051 | 3/1968 | Stalego | 428/384 |
| 3,513,019 | 6/1970 | Miller et al. | 428/903 |
| 4,324,843 | 4/1982 | Brennan et al. | 428/367 |
| 4,464,192 | 8/1984 | Layden et al. | 501/95 |
| 4,464,475 | 8/1984 | Beall et al. | 501/9 |
| 4,543,345 | 9/1985 | Wei | 501/95 |
| 4,569,886 | 2/1986 | Divecha et al. | 428/379 |
| 4,574,063 | 3/1986 | Scherer | 501/68 |

*Primary Examiner*—Sharon A. Gibson
*Attorney, Agent, or Firm*—Kees van der Sterre

[57] ABSTRACT

Oxide-coated whiskers suitable for consolidation into or incorporation within a whisker-reinforced composite ceramic article are provided by dispersing inorganic whiskers in a colloidal oxide sol, separating the dispersion into fine droplets, and drying the droplets to provide a solid particulate product comprising the coated whiskers. The continuous oxide coating on the whiskers provides protection and aids in composite consolidation.

4 Claims, 2 Drawing Sheets

COMPOSITE CERAMIC ARTICLE AND METHOD FOR MAKING IT

BACKGROUND OF THE INVENTION

The present invention is in the field of whisker-reinforced composite ceramic articles, and specifically relates to an improved method for making whisker reinforced composites which permits the uniform incorporation of small or relatively large proportions of reinforcing whisker materials in the ceramic matrix.

The use of inorganic whiskers and fibers to reinforce glasses, glass ceramics, and ceramics has long been practiced. In most references in the literature, whiskers have frequently been characterized as relatively short, single-crystal fibers of small (less than 100 microns) diameter, while fibers are considered to be multicrystalline or amorphous and are generally sufficiently long to be used in woven or otherwise interlocking bundles, tows or cloth. Hence whiskers are typically incorporated as a randomly dispersed phase in a selected glass or ceramic matrix, while fibers are more frequently incorporated in a controlled oriented or interlocking alignment.

The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material.

Whiskers are thought to impart strengthening by a similar mechanism, but load transfer to whiskers by the matrix is more limited due to the limited length and aspect ratio of the whiskers. Theoretically, a whisker which is sufficiently short will not be loaded to the breaking point by the matrix under stress, and therefore full advantage cannot be taken of the high strength of the whiskers.

Among the fibers and whiskers which have been suggested for use as reinforcement for nonmetal matrix materials are silicon carbide, silicon nitride, alumina and carbon whiskers. For example, U.S. Pat. No. 4,324,843 describes SiC fiber reinforced glass-ceramic composite bodies wherein the glass-ceramic matrix is of aluminosilicate composition. U.S. Pat. No. 4,464,475 describes similarly reinforced glass-ceramics comprising barium osumilite as the predominant crystal phase, while U.S. Pat. No. 4,464,192. describes whisker-reinforced glass-ceramic composites of aluminosilicate composition.

Composite materials have also been proposed for applications requiring strength and stability at very high temperatures. In this case, however, wholly ceramic materials, i.e., crystalline materials essentially free of residual glassy phases, are considered to hold the greatest promise. Ceramic materials are more difficult to reinforce with fibers or whiskers than materials comprising glassy phases, and the properties of whisker-ceramic composites are not as well understood, but they offer the prospect of high temperature creep resistance. Hence, it is presently thought that whiskers dispersed in a crystalline matrix will mainly occupy sites along grain boundaries in the material, and will thereby improve high-temperature stability by increasing the length of shear required and/or the complexity of the shear needed to cause permanent dimensional change or creep in the material.

A further objective of whisker reinforcement in ceramic and glass-ceramic materials for high temperature applications is that of increasing the toughness of the material. A toughened ceramic material exhibits improved resistance to cracking failure from flaws sustained in use, offering the possibility of increased fatigue lifetime and, most desirably, a noncatastrophic mode of failure which can be more easily identified by routine inspection.

The mechanisms of toughening in wholly ceramic matrices have been reviewed by R. W. Rice in "Mechanisms of Toughening in Ceramic Composites", *Ceram. Eng. Sci. Proc.*, 2 (7–8) 661–701 (1981). Strengthening mechanisms identified in this monograph include load transfer, prestressing, crack impediment or deflection, and fiber pullout. U.S. Pat. No. 4,543,345 reports on the addition of silicon carbide whiskers to ceramic matrix materials such as alumina, mullite and boron carbide, with some toughening observed to result from these additions. Thus whisker toughening has been demonstrated to offer useful enhancements to the physical properties of ceramics in some systems.

In order to fully realize the potential of glass and ceramic composite materials for the production of strong tough components, the materials themselves must be produced in a form which is free of extraneous glassy or crystalline phases, and which is also free of included cracks or voids. Particularly in the case of ceramic and glass-ceramic composite materials, these requirements place constraints on the composition and morphology of the starting materials. For example, pure matrix materials must be available in a readily dispersible particulate form so that whisker reinforcement additives can be uniformly dispersed in the matrix prior to consolidation.

It is difficult to produce refractory compositions in high purity and small uniform particle size by melting. Further, even with hot-pressing at high temperatures, it is not easy to achieve complete consolidation to a void-free product unless an optimum particle size distribution in the matrix material has been achieved. Finally, the presence of a whisker phase significantly increases the viscosity of the material being consolidated, such that the proportions of whisker reinforcement in the matrix must generally be limited to moderate levels (less than about 50 volume percent) where full, void-free consolidation is required.

It is a principal object of the present invention to provide an improved method for producing whisker-reinforced composite materials which facilitates the production of dense homogeneous composites at higher whisker loadings and lower temperatures and pressures than previously attainable.

It is a further object of the invention to provide composites of enhanced purity and a method for making them.

It is a further object of the invention to provide whisker-reinforced composites incorporating highly refractory matrix materials which are nevertheless consolidated to nearly theoretical density.

It is a further object of the invention to provide composites exhibiting enhanced uniformity of whiskers in the matrix and thus properties which are more reproducible and homogeneous.

Other objects and advantages of the invention will become apparent from the following description thereof.

SUMMARY OF THE INVENTION

The present invention provides a process for the fabrication of whisker-reinforced composite ceramics wherein whiskers comprising a coating of the matrix oxide material are utilized. Oxide-coated whiskers offer a number of substantial advantages over conventional whiskers, including utility at higher whisker loadings in ceramic matrix materials than can be realized utilizing conventional whiskers. Thus composites containing conventional or unusually high whisker loadings can be consolidated to high density utilizing the coated whiskers of the invention.

Further, oxide-coated whiskers provided in accordance with the present invention can provide highly uniform dispersions of the whiskers in the consolidated matrix. Thus whisker agglomerations, which can lead to wide property variations in such properties as strength and fracture toughness, can be reduced. As has been recognized, one of the important reasons for incorporating whiskers in ceramic matrices is the attainment of higher Weibull moduli, which would reflect higher structural reliability for the composite material. This objective cannot be achieved unless a uniform dispersion of whiskers in the ceramic matrix is attained.

A further advantage of the invention results from the fact that the coating of matrix oxides on the whiskers is provided from a sol of high purity, such that inclusions of foreign oxides and other materials in the composite material are readily avoided. In addition, matrix compositions which are very refractory can be applied as coatings to the whiskers, avoiding the need to prepare these coatings under high-temperature conditions which might damage the whiskers.

Broadly characterized, then, the invention comprises a method for making a whisker-reinforced composite ceramic article which involves the steps, first, of forming a liquid sol or colloid comprising colloidal particles of one or more inorganic oxide(s). Generally, these oxides will be selected from the group consisting of $SiO_2$, $Al_2O_3$, $CaO$, $MgO$, $BaO$, $ZrO_2$, $TiO_2$ and $P_2O_5$. The sol is typically a water/alcohol-based sol wherein the oxide particles are generated by hydrolysis of alkoxides of the metallic constituents of these oxides.

The sol thus provided is combined with an inorganic whisker reinforcement material, which material is typically selected from the group consisting of SiC, $Si_3N_4$, C, $Al_2O_3$ or a similar refractory inorganic whisker material. Combination is effected so as to form a uniform dispersion of the whiskers in the sol.

The whisker-sol dispersion thus provided is next separated into fine droplets and dried to form a dried particulate product comprising oxide encapsulated or oxide-coated whiskers. Whisker-free oxide particles may also be present. The oxide coating on the whiskers is made up principally of the oxide or mixture of oxides present in the initial fluid sol, and may be characterized as an assemblage of agglomerated, submicron-sized oxide particles forming a generally continuous coating over individual whiskers or whisker clusters. The oxide particles may be hydrous or hydrated oxides, and are generally, though not necessarily, present on the whiskers in unreacted, i.e. free oxide or hydrous oxide, form.

The oxide-coated whiskers thus provided can be directly consolidated, along with the whisker-free oxide particles or after separation therefrom, to form a composite ceramic material. Alternatively, they may be combined with additional matrix oxides or oxide compounds in particulate form prior to consolidation. In either case, the presence of the oxide coating on the whisker reinforcing material results in easier and more complete consolidation of the whisker-oxide material, and thus a composite product exhibiting higher density and a greater degree of freedom from cracks and voids under milder consolidation conditions than are normally required to form similar composites by other fabrication methods.

The invention further comprises an oxide-coated whisker product and a method for making it, the product being particularly useful in the production of whisker-reinforced ceramic products. The whisker product consists of oxide-coated whiskers produced as above described by dispersing the whiskers in a suitable sol or colloid and then dispersing and drying the sol to form dried particulate material.

The consolidation behavior of the oxide-coated whiskers may be enhanced, if desired, by heating the whiskers after drying to a temperature sufficient to remove residual water and organic components therefrom. Further, crystallization of amorphous oxide coatings may be induced by heat treatment of the whiskers to relatively high temperatures, e.g., above 1000° C., if desired, employing inert atmospheres as needed to avoid whisker oxidations.

The whisker product thus provided may be used as a whisker reinforcement material of enhanced matrix compatibility in glass, glass-ceramic, or ceramic matrix materials having compositions the same as or differing from the composition of the oxide coating materials present on the whiskers. Thus the oxide coating on the whiskers serves to enhance the consolidation characteristics of whisker-oxide mixtures in which the whiskers are present, and also serves to protect the whiskers in some respects from the possible adverse effects of physical dispersion in and consolidation with conventional oxide matrix materials.

DESCRIPTION OF THE DRAWINGS

The invention may be further understood by reference to the drawings wherein.

DETAILED DESCRIPTION

Figure 1:
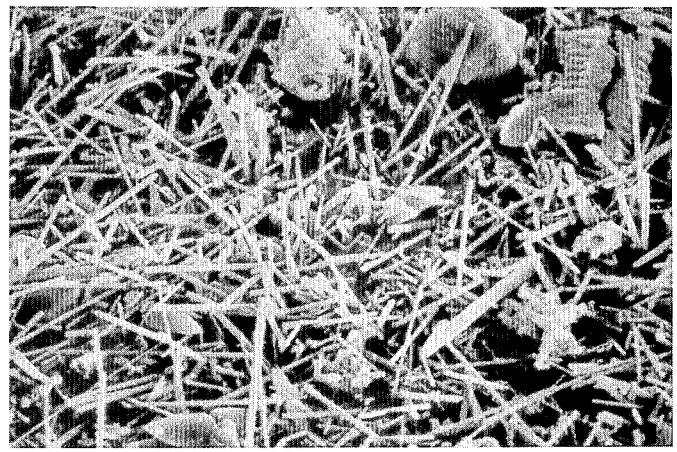
FIG. 1 is a photomicrograph of a prior art SiC whisker reinforcement material.
Figure 1:

The present invention relies for its effectiveness, in part, upon attaining a uniform and relatively homogeneous and continuous coating or embedment around individual whiskers to be incorporated in the ceramic or glass matrix. It is the achievement of a complete coating which aids in obtaining complete consolidation as the coated whiskers are formed into a unitary composite product by sintering, hot-pressing or the like.

The attainment of a uniform oxide coating on the surfaces of whiskers of very fine dimensions in accordance with the invention requires the use of a stable oxide dispersion or sol rather than a conventional oxide slurry of relatively large oxide particles. Oxide suspensions or sols having oxide particles present therein with the requisite small particle size, i.e. less than about 0.5 microns are, however, known and may be formulated in accordance with conventional practice.

Published British Application GB No. 2,041,913 describes the production of pure multicomponent glasses from sols produced by the hydrolysis of alkoxides in solution. The solutions are typically water-alcohol solutions comprising silicon alkoxides alone or in combination with the alkoxides of boron, phosphorous, germanium, zirconium, titanium, or aluminum. The hydrolysis of these alkoxides in solution to produce silica or mixed oxide sols is normally catalyzed by the addition of small amounts of acids such as HCl.

The use of alkoxide sols such as described in the aforementioned British patent application insures that high purity in the oxide coating may be achieved, and that a wide variety of different oxide compositions for the coating or encapsulation for the whiskers is possible. Further, the oxide particle sizes attainable in these sols is very small, e.g., below about 0.1 micron, so that homogeneous or uniform oxide coatings on the whiskers may readily be attained.

Alternative media for coating or encasing the whisker reinforcement in an oxide matrix material include the nonaqueous oxide suspensions described, for example, in U.S. Pat. No. 4,574,063. The suspensions or so-called colloids described in that patent comprise particulate oxides of small particle size, such as fumed oxides produced by the flame oxidation of volatile metal chlorides or organometallic compounds, and are typically stabilized by chemical means so that the oxide particles remain suspended in the nonaqueous vehicle for an indefinite period without agglomeration or flocculation. The oxide particles can be somewhat larger than typically developed in alkoxide sols, e.g., up to about 0.5 microns or even larger. However this particle size is sufficiently small that uniform coating or encapsulation of whisker reinforcement materials is attainable.

Like alkoxide sols, nonaqueous oxide colloids such as described in the '063 patent are available in high purity, and can be produced with a wide range of oxide composition, limited only by the capability to produce the desired oxide in sufficiently fine particle form.

If desired, the sol or colloid may additionally comprise dissolved oxidizable compounds of metals to be included as oxides in the ceramic matrix. The metals may be any of those above disclosed as useful in the form of oxide particles in the sol, and may be provided as inorganic salts, organometallic complexes or in any other soluble or dispersible form.

The dispersion of the whisker reinforcement in the selected oxide sol or colloid is conveniently accomplished by high-speed blending or similar processing which will optimize the degree of dispersion of the whiskers in the oxide sol. Some commercially available whisker reinforcement, such as for example silicon carbide whiskers, are supplied commercially in agglomerated form and must be deagglomerated, typically by dispersion in a liquid, in order to achieve homogeneous dispersion. Where dispersion of agglomerates of whiskers is difficult, commercially available dispersants such as chemical surfactants could be used to aid in achieving deagglomeration and dispersion of the whiskers in the sol.

As noted above, the use of an oxide coating or encapsulation for the whisker reinforcement in accordance with the invention facilitates the attainment of higher loadings of whiskers in the composite product than can be conveniently attained in accordance with prior art methods. Thus the proportion of whisker additions to the oxide sol or suspension may be adjusted to give the desired level of whisker loading in the product simply by adjusting the proportions of whiskers and oxide solids present in the liquid dispersion. Typically, loadings of whiskers in the dispersion will be such as to provide 10-70% of whiskers by volume based on the total volume of oxide solids plus whiskers present in the dispersion. The viscosity of this dispersion can of course be adjusted at the mixing stage to any desired value simply by the addition or extraction of vehicle components such as alcohol or other solvents from the dispersion.

The production of the oxide-coated whisker reinforcement in dry particulate form requires the extraction of the vehicle components from the dispersed mixture. Optimum consolidation characteristics in the matrix-coated whiskers requires the maximum practicable separation of the whiskers into individual coated particles as the solvent or vehicle components are removed from the dispersion. This is most conveniently attained by dividing the dispersion into the form of very fine droplets, as by spraying, and then removing the liquid components from the individual droplets prior to liquid-liquid condensation. This can be accomplished, for example, by conventional spray drying processes, although the selection of equipment and processing parameters to maximize the proportion of fine particulates in the spray dried product will generally be employed.

The coated reinforcing whiskers or so-called oxide-coated whisker product resulting from processing as above described may be characterized as whiskers having a surface coating comprising an oxide or mixture of oxides preferably selected from the group consisting of $SiO_2$, $Al_2O_3$, CaO, MgO, BaO, $ZrO_2$, $TiO_2$, and $P_2O_5$. The oxide coating is typically made up of oxide particles or agglomerates thereof wherein the particles do not exceed about 0.5 microns in size, and are thus capable of forming a continuous coating on the whiskers. The coating may be relatively thin or it may consist of a heavy encapsulating mass. Preferably, however, the thickness of the coating will not exceed about three times the diameter of the uncoated whisker. The particle size of the whisker product is also generally quite small, averaging less than the maximum length of the uncoated whiskers, e.g., normally less than 100 microns.

The coated whisker product provided in accordance with the invention may be blended with additional matrix materials if desired, the additional matrix having a composition which is the same as or different from the oxide or oxide mixture forming the coating on the whiskers. Combination with the additional matrix material may be by dry mixing, or the coated whiskers may be redispersed in a suitable vehicle along with the added matrix material and the resulting slurry or dispersion formed into an appropriate configuration for a composite preform or product by casting, extrusion, pressing or any other suitable forming technique.

More typically, the whiskers will be present in the coated whisker reinforcement material in the proportion desired in the composite preform or product, and thus the coated whisker product will simply be consolidated into a composite product without the addition of further matrix components. Consolidation of the coated material may be accomplished by any suitable conventional method such as pressureless sintering, hot-pressing, hot isostatic pressing, or similar processing. Due to the relatively small particle size of the coated or encapsulated whisker material and the fact that the whiskers are already in intimate contact with the matrix material, consolidation of the material to void-free composite ceramic preforms or products is relatively easy.

The invention may be further understood by reference to the following detailed examples thereof which are, however, merely illustrative of the invention and are not intended to be limiting.

EXAMPLE I

A silicon carbide whisker-reinforced mullite ceramic product is prepared from oxide-coated silicon carbide whisker reinforcement material by a hot-pressing procedure. To provide the coated whiskers, an alumina sol is first prepared by providing a water solution of aluminum sec-butoxide [$Al(OC_4H_9)_3$]. The solution has a water-to-alkoxide mole ratio of approximately 40:1. Hydrolysis of this solution is carried out by heating the solution at approximately 80° C. for 30 minutes with vigorous stirring. A nitric acid peptizing agent is then added to this solution at a molar concentration ratio of 0.1:1 to the aluminum alkoxide. The acidified solution is maintained at approximately 80° C. for 72 hours, thereupon providing an alumina sol wherein the alumina has sufficiently fine particle size (in the range of 50-500 A) that the sol is pseudo-transparent.

A silica sol for combining with the described alumina sol is next prepared from tetraethylorthosilicate [$Si(OC_2H_5)_4$]. An ethyl alcohol solution of the orthosilicate, having a 1:1 molar ratio of the silicate to the alcohol, is added to water in a proportion providing a water-to-silicate ratio of 10:1. Hydrolysis of the silicate thereupon commences and is continued for approximately 10 minutes with constant stirring, after which nitric acid is added to the solution in a molar ratio of approximately 0.1:1 with the silicate. The resulting silica sol is again essentially transparent, indicating the presence of the oxide therein in very small particle size.

The silica and alumina sols thus provided are next combined to achieve a $SiO_2:Al_2O_3$ mole ratio of 2:3, and silicon carbide whiskers are dispersed in the resulting mixed $SiO_2:Al_2O_3$ sol to obtain a uniform whisker dispersion. The whiskers employed consist of Arco SC-9 whiskers, commercially available from Arco Metals, Greer, S.C. FIG. 1 of the drawing consists of an electron photomicrograph of this whisker material wherein the scale line represents a dimension of 10 microns.

The whiskers are added in a proportion providing a whisker:oxide volume ratio of 3:7, i.e. a dispersion wherein the whiskers constitute 30 volume percent of the total solids present in the mixture. Dispersion of the whiskers in the sol does not require the use of a chemical dispersant, but is promoted by high-speed blending.

The whisker dispersion thus provided is next spray dried in air using a Bowen Engineering spray dryer, Model BE1074, operating at an inlet temperature of 150° C. and an outlet temperature of 90° C. This procedure provides a product which includes a component consisting of individual whiskers supporting a coating or encapsulating layer of alumina-silica particles on the surfaces thereof. These whiskers predominate in the fine fraction collected from the spray dryer.

Figure 2:
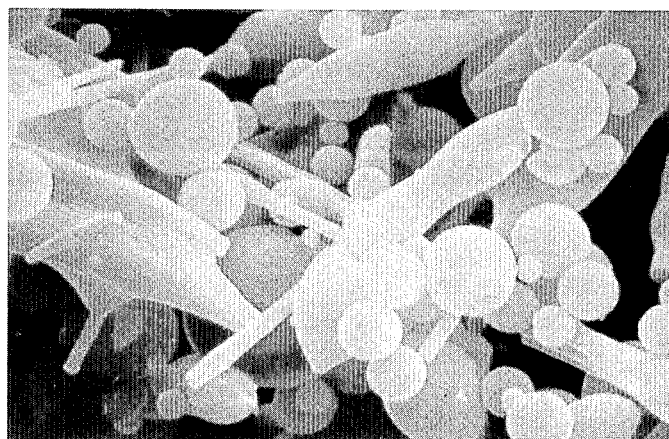
FIG. 2 is a photomicrograph of an oxide-coated whisker product provided in accordance with the invention.
Figure 2:
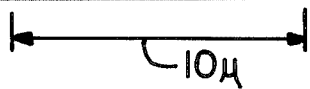

FIG. 2 of the drawing is an electron photomicrograph of the fine fraction of the product produced in accordance with the above-described procedure, wherein the scale line represents a dimension of 10 microns. The particle size of the whisker product, estimated from photomicrographs, does not exceed the maximum length of the whiskers which is of the order of 50 microns. Also collected with the coated whisker product, as shown in the micrographs, are small spherical oxide granules of the matrix oxides.

The collected fraction comprising the coated whisker product is next fired in a vacuum to 1000° C. for one hour to drive out water and organic constituents remaining from the original sols. Finally the resulting material is hot pressed at 1700° C. at a pressure of 5000 psi for approximately 15 minutes to achieve consolidation thereof.

Examination of the consolidated whisker-oxide composite material resulting from the hot-pressing step shows a silicon carbide-whisker reinforced product wherein mullite ($3Al_2O_3:2Si_2O_2$) constitutes the ceramic matrix phase. The hot-pressed composite is substantially free of cracks and voids, and exhibits a modulus of rupture strength of 60,000 psi and a fracture toughness of 4.8 MPa.m$^{\frac{1}{2}}$. At temperatures of 1200° C. and 1300° C., the composite material exhibits a modulus of rupture strength of 60,000 psi and 41,000 psi, respectively.

Figure 3:
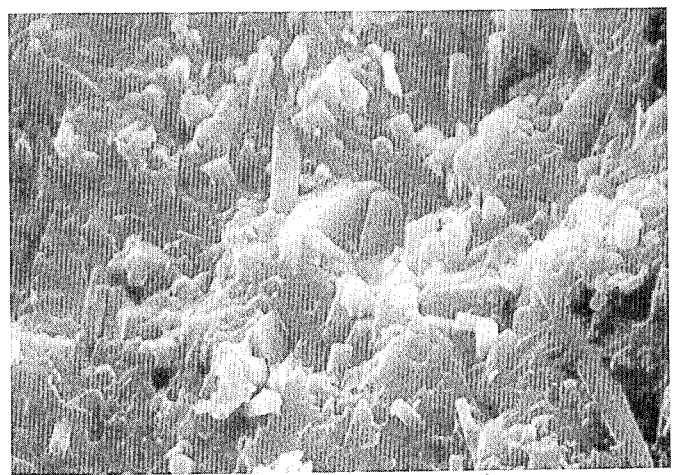
FIG. 3 is a photomicrograph of a fractured surface of a composite ceramic article provided in accordance with the invention after fracture at 1300° C.

FIG. 3 of the drawing consists of an electron photomicrograph of the fracture surface of a composite whisker-mullite sample provided as above described after fracture-testing at 1300° C. The scale line in the photomicrograph corresponds to a dimension of 10 microns. Examination of the micrograph, and particularly the crystalline matrix phase surrounding the rod-like whiskers protruding from the fracture surface, suggests that no significant deformation of the matrix has occurred in the course of fracture testing, even at the elevated test temperature of 1300° C. This is evidenced by the relatively sharp definition of crystal facets in the matrix material.

Figure 4:
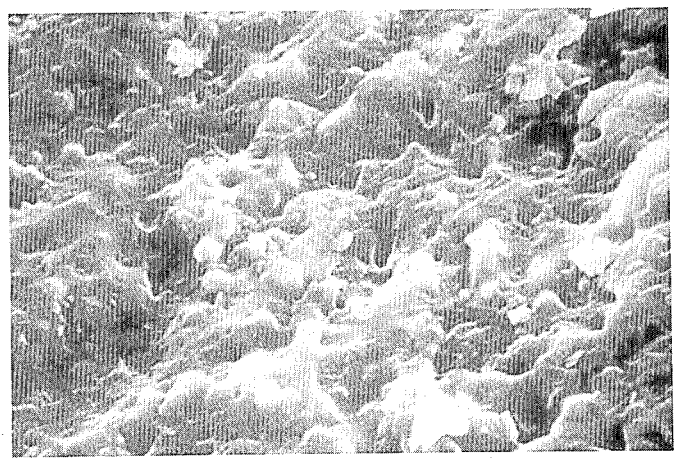
FIG. 4 is a photomicrograph of a fracture surface of a prior art composite ceramic article after fracture at 1200° C.

The appearance of the matrix shown in FIG. 3 may be contrasted with the appearance of the fracture surface of a prior art whisker-mullite composite which is shown in the electron photomicrograph constituting FIG. 4 of the drawing. Again, the scale line in the micrograph represents a dimension of 10 microns.

The whisker-mullite composite shown in FIG. 4 was prepared by hot-pressing a mixture consisting essentially of 30 volume percent of uncoated SiC whiskers and the remainder high-purity crystalline mullite powder. The mullite powder used to make the composite is commercially available from Baikowski International Corp., Charlotte, N.C., as Grade SA193CR high-purity mullite powder. The whisker-mullite mixture was hot-pressed at 1700° C. under a pressure of 5000 psi for 15 minutes, as in Example 1 above.

The fracture surface shown in FIG. 4 resulted from the fracture-testing of this conventionally made whisker-mullite composite at 1200° C. In contrast to FIG. 3, the crystalline mullite matrix shows significant deformation evidenced by almost total loss of definition in the crystalline facets of the matrix. Modulus of rupture strengths for this prior art composite were 52,000 and 50,000 psi as determined at 25° C. and 1200° C., respectively. As the photomicrographs suggest, the composite of Example I shown in FIG. 3 thus exhibits substantially higher refractoriness than the prior art composite illustrated in FIG. 4.

EXAMPLE II

(Alumina-Coated Whisker Product)

Silicon carbide whisker-reinforced alumina ceramic composites may be prepared from alumina-coated silicon carbide whiskers produced in accordance with the following example. An alumina sol is first prepared following the procedure described in Example I from a water solution of aluminum sec-butoxide. After hydrolysis and the addition of the peptizing agent to form the transparent alumina sol, silicon carbide whiskers are added to the sol to obtain a uniform whisker dispersion therein. The whiskers employed consist of Arco SC-9 whiskers, the whiskers being added to the sol such that the volume ratio of whiskers to alumina particles in the sol is about 1:1.

The whisker-containing sol thus provided is processed through a spray dryer in accordance with the procedure described in Example I. The spray-dried material is next fired at 800° C. in air for 2 hours to remove all water and organics from the material. The coated whiskers produced by this processing comprise silicon carbide whiskers with an amorphous alumina coating as determined by X-ray diffraction analysis.

To convert the amorphous alumina coating on the whiskers to crystalline alumina, the spray dried whiskers are heat-treated in $N_2$ at 1500° C. for 1 hour. X-ray diffraction analysis of the product of this heat treatment indicates that the amorphous alumina coating has been converted to alpha-alumina.

A composite ceramic article may be prepared from this whisker product, if desired, by hot-pressing at a temperature of 1850° C. at a pressure of 5000 psi for an interval of about 45 minutes. This firing should be carried out under an inert atmosphere such as nitrogen in order to avoid oxidation of the silicon-carbide whisker phase.

EXAMPLE III

(Anorthite Composite)

A silicon carbide whisker-reinforced anorthite ceramic product is prepared from oxide-coated silicon carbide whiskers using a hot-pressing procedure. Silicon carbide whiskers comprising an oxide coating crystallizable to anorthite ($CaO \cdot Al_2O_3 \cdot 2SiO_2$) are provided by dispersion of the whiskers in an appropriate sol in accordance with the following procedure.

An alumina sol is first prepared, following the procedure described in Example I, from a water solution of aluminum sec-butoxide. A transparent alumina sol is provided by hydrolysis of this solution followed by the addition of a nitric acid peptizing agent, resulting in an alumina sol wherein the alumina particle size is again approximately 50–500 Å.

A silica sol is also provided following the procedure of Example I from an ethyl alcohol solution of tetraethylorthosilicate. An alcohol solution of the orthosilicate is added to water to provide a 10:1 water:silicate ratio. Hydrolysis of this solution followed by nitric acid peptization yields a silica sol comprising very small silica particles.

The silica and alumina sols thus provided are next combined to achieve a $SiO_2:Al_2O_3$ solids ratio of approximately 1:2.

After the $Al_2O_3$-$SiO_2$ sol has been prepared, a $Ca(NO_3)_2$ solution is added to the sol to provide the calcium source for anorthite formation. The calcium nitrate solution consists of a 10% (weight) solution of the nitrate in deionized water, and is heated to 80° C. prior to being added to the heated silica-alumina sol. The solution addition is in a proportion sufficient to obtain a 1:1:2 mole ratio of $CaO:Al_2O_3:SiO_2$ in the resulting mixture.

Following the addition of the calcium nitrate solution to the sol, silicon carbide whiskers such as utilized in Examples I and II above are added to the solution to provide a whisker dispersion wherein the whiskers constitute 25 wt. % of the total solids. Dispersion is by means of a high speed blender.

The whisker dispersion is next spray-dried under the conditions described in Example I to produce a coated whisker product which is calcined at 800° C. for 16 hours to remove all residual moisture and organics.

An anorthite whisker composite is provided from this whisker product by hot-pressing the whiskers at 1500° C. and 3000 psi for a pressing period of 0.5 hours. X-ray examination of the resulting composite indicates that the matrix has been transformed to triclinic anorthite. The room temperature modulus of rupture strength of the composite is about 45,000 psi.

As the foregoing illustrative examples indicate, the methods and products of the invention offer an effective route to the production of whisker-reinforced composite ceramic products which are substantially free of cracks and voids, exhibit relatively high whisker loadings, and are easily consolidated by conventional hot-pressing or other standard consolidation techniques.

We claim:

1. Oxide-coated whisker wherein said coated whiskers have the form of a dried particulate material, said material comprising individual inorganic whiskers encapsulated in an oxide coating material, the oxide coating material consisting of an inorganic oxide or mixture of oxides selected from the group consisting of $SiO_2$, $Al_2O_3$, $CaO$, $BaO$, $ZrO_2$, $TiO_2$, and $P_2O_5$, said oxides being present in unreacted form and forming a continuous oxide coating on the whiskers.

2. Oxide-coated whiskers in accordance with claim 1 wherein the inorganic whiskers are whiskers selected from the group of SiC, $Si_3N_4$, C and $Al_2O_3$ whiskers.

3. Oxide-coated whiskers in accordance with claim 2 wherein the dried particulate material has an average particle size less than the maximum length of the inorganic whiskers.

4. Oxide-coated whiskers in accordance with claim 3 wherein the thickness of the oxide coating material does not exceed about 3 times the diameter of the inorganic whiskers.

* * * * *